US 11,502,812 B1

(12) United States Patent
Sarda (10) Patent No.: US 11,502,812 B1
(45) Date of Patent: Nov. 15, 2022

(54) DATA PROTOCOL OVER CLOCK LINE

(71) Applicant: Skyworks Solutions, Inc., Irvine, CA (US)

(72) Inventor: Vivek Sarda, Austin, TX (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 17/375,634

(22) Filed: Jul. 14, 2021

(51) Int. Cl.
    *H04L 7/00* (2006.01)
    *H04L 67/147* (2022.01)
    *H04L 9/40* (2022.01)

(52) U.S. Cl.
    CPC .......... *H04L 7/0008* (2013.01); *H04L 7/0079* (2013.01); *H04L 7/0091* (2013.01); *H04L 63/0428* (2013.01); *H04L 67/147* (2013.01)

(58) Field of Classification Search
    CPC ... H04L 7/0008; H04L 7/0079; H04L 67/147; H04L 63/0428; H04L 7/0091; H04L 27/12; H04L 49/30; H04L 25/4902; H04L 7/06; H03L 7/0992; H04J 3/0632; G08C 23/04
    USPC .......................... 375/356, 357, 373, 257, 258
    See application file for complete search history.

(56) References Cited

U.S. PATENT DOCUMENTS

| | | | |
|---|---|---|---|
| 5,140,611 A * | 8/1992 | Jones | ........................ H04L 7/06 375/362 |
| 5,509,038 A | 4/1996 | Wicki | |
| 5,644,604 A | 7/1997 | Larson | |
| 5,964,880 A | 10/1999 | Liu | |
| 6,549,046 B1 | 4/2003 | Klecka, III | |
| 6,760,586 B1 | 7/2004 | Lee | |
| 6,839,858 B1 | 1/2005 | James | |
| 6,885,647 B1 | 4/2005 | Chung et al. | |
| 7,002,996 B1 | 2/2006 | Dougherty et al. | |
| 7,079,589 B1 * | 7/2006 | Maksimovic | ....... H04L 25/4902 375/295 |

(Continued)

FOREIGN PATENT DOCUMENTS

| CN | 102291233 | 12/2011 |
|---|---|---|
| CN | 103684727 | 3/2014 |

(Continued)

OTHER PUBLICATIONS

U.S. Appl. No. 17/134,818, filed Dec. 28, 2020, entitled "FSYNC Mismatch Tracking," by Vivek Sarda.

(Continued)

*Primary Examiner* — Phuong Phu
(74) *Attorney, Agent, or Firm* — Zagorin Cave LLP (57) ABSTRACT

A system includes a plurality of line cards and a timing card. A clock generation circuit on the timing card generates a clock signal which is pulse width modulated according to information to be transmitted. A clock line supplies the pulse width modulated clock signal to the line cards. The timing card sends a first control word to the plurality of line cards over the clock line after sending a beacon. The first control word includes a size field specifying a first length of first data following the first control word. The timing card sends time of day information over the clock line to the line cards following the first control word. The time of day information may be encrypted. A second control word follows the time of day information. One or more additional control words can follow the second control word before the next beacon.

23 Claims, 9 Drawing Sheets

(56) References Cited

U.S. PATENT DOCUMENTS

| | | |
|---|---|---|
| 7,116,743 B1 | 10/2006 | Wang |
| 7,203,227 B1 | 4/2007 | Currivan |
| 7,417,510 B2 | 8/2008 | Huang |
| 7,451,337 B1 | 11/2008 | Hewitt |
| 7,451,339 B2 | 11/2008 | Smith, Sr. |
| 7,535,893 B1 | 5/2009 | Beladakere et al. |
| 7,860,205 B1 | 12/2010 | Aweya et al. |
| 7,903,681 B2 | 3/2011 | Roberts et al. |
| 8,355,476 B2 | 1/2013 | Lee |
| 8,942,561 B2 | 1/2015 | Boyd et al. |
| 9,246,615 B2 | 1/2016 | Ellegard et al. |
| 9,369,270 B1 | 6/2016 | Spijker |
| 9,426,762 B2 | 8/2016 | Ehlers et al. |
| 9,479,182 B1* | 10/2016 | Baidas .............. H04L 7/00 |
| 9,594,396 B2 | 3/2017 | Turner et al. |
| 9,628,255 B1* | 4/2017 | Baidas ............ H04L 7/0008 |
| 9,665,121 B2 | 5/2017 | Aweya |
| 9,860,004 B2 | 1/2018 | Joergensen |
| 9,960,873 B2 | 5/2018 | Yang |
| 10,007,639 B2 | 6/2018 | Mitric |
| 10,075,284 B1* | 9/2018 | Rodrigues ............ H04L 49/30 |
| 10,084,559 B1 | 9/2018 | Devineni |
| 10,158,444 B1 | 12/2018 | Darras |
| 10,511,312 B1 | 12/2019 | Pastorello et al. |
| 10,536,258 B2 | 1/2020 | Choo et al. |
| 10,594,423 B1 | 3/2020 | Anand et al. |
| 10,715,307 B1 | 7/2020 | Jin |
| 10,727,845 B1 | 7/2020 | Balakrishnan |
| 10,797,686 B1 | 10/2020 | Terstrup et al. |
| 10,917,097 B1 | 2/2021 | Meyer et al. |
| 10,951,216 B1* | 3/2021 | Barnette ............ H03L 7/0992 |
| 11,061,432 B2 | 7/2021 | Sarda |
| 11,088,816 B1 | 8/2021 | Sarda |
| 11,088,819 B1 | 8/2021 | Sarda |
| 2006/0020733 A1* | 1/2006 | Sarda ............... G06F 13/4291 |
| | | 710/305 |
| 2006/0280182 A1* | 12/2006 | Williams ............ H04J 3/0632 |
| | | 375/E7.278 |
| 2007/0046516 A1* | 3/2007 | Dornbusch ......... H04L 27/12 |
| | | 341/143 |
| 2008/0080563 A1 | 4/2008 | Kataria |
| 2008/0240169 A1 | 10/2008 | Cui et al. |
| 2009/0024865 A1* | 1/2009 | Fugaro ............... G08C 23/04 |
| | | 713/600 |
| 2009/0168808 A1 | 7/2009 | Cho |
| 2009/0251226 A1 | 10/2009 | Kathuria et al. |
| 2010/0118894 A1 | 5/2010 | Aweya et al. |
| 2011/0296226 A1 | 12/2011 | Sorbara et al. |
| 2012/0300795 A1 | 11/2012 | Joergensen |
| 2012/0319734 A1 | 12/2012 | Nagaraj |
| 2013/0121347 A1 | 5/2013 | Saito et al. |
| 2014/0068315 A1 | 3/2014 | Aweya et al. |
| 2014/0320181 A1 | 10/2014 | Mitric |
| 2015/0092797 A1 | 4/2015 | Aweya |
| 2015/0185759 A1 | 7/2015 | Hinderer et al. |
| 2015/0200770 A1 | 7/2015 | Rahbar et al. |
| 2015/0207620 A1 | 7/2015 | Colby |
| 2015/0222276 A1 | 8/2015 | Milijevic |
| 2016/0170439 A1 | 6/2016 | Aweya |
| 2016/0182217 A1 | 6/2016 | Hashizume |
| 2017/0135053 A1 | 5/2017 | Shenoi et al. |
| 2017/0288801 A1 | 10/2017 | Aweya |
| 2017/0373824 A1 | 12/2017 | Mitchler |
| 2019/0020333 A1 | 1/2019 | Koch et al. |
| 2019/0036804 A1 | 1/2019 | Mihelic et al. |
| 2019/0379474 A1 | 12/2019 | Coulter |
| 2019/0379475 A1 | 12/2019 | Seethamraju |
| 2020/0021379 A1 | 1/2020 | Aweya |
| 2020/0028666 A1 | 1/2020 | Goldin et al. |
| 2020/0050575 A1* | 2/2020 | Mishra .............. G06F 13/4282 |
| 2020/0127752 A1 | 4/2020 | Tai et al. |
| 2020/0285265 A1 | 9/2020 | Ranganathan et al. |
| 2021/0157355 A1 | 5/2021 | Sarda et al. |
| 2021/0297083 A1 | 9/2021 | Nishikawa |
| 2021/0328758 A1 | 10/2021 | Sarda |

FOREIGN PATENT DOCUMENTS

| | | |
|---|---|---|
| CN | 104378193 | 2/2015 |
| CN | 107294634 | 10/2017 |
| WO | WO2015003364 | 1/2015 |

OTHER PUBLICATIONS

U.S. Appl. No. 16/836,713, filed Mar. 31, 2020, entitled "Secondary Phase Compensation Assist for PLL IO Delay Aligning Sync Signal to System Clock Signal," by Vivek Sarda.

U.S. Appl. No. 16/836,706, filed Mar. 31, 2020, entitled "Secondary Phase Compensation Assist for PLL IO Delay," by Vivek Sarda.

NXP Semiconductors, AN-12149, Implementing an IEEE 1588 V2 on i.MX RT Using PTPd, FreeRTOS, and lwIP TCP/IP stack, Sep. 2018 (Year 2018), 28 pages.

Broadcom Corp., "Ethernet Time Synchronization Providing Native Timing Within the Network," White Paper, Oct. 2008, 36 pages.

Eidson, J., "IEEE-1588 Standard for a Precision Clock Synchronization Protocol for Networked Measurement and Control Systems," Agilent Technologies, 2005, 94 pages.

Gallant, D., "Practical Implementation of a IEEE 1588 Based Synchronization Distribution System," Silicon Laboratories, WSTS Jun. 19, 2018, 15 pages.

International Telecommunication Union, G.8273/Y.1368 (2018)—Amendment 1, Framework of phase and time clocks, ITU-T, Mar. 2020 (Year 2020) 38 pages.

Renesas, "Synchronization Management Unit," 8A34002 Datasheet, Renesas Electronics Corporation, Sep. 8, 2020, 107 pages.

Renesas, 82P33831, Synchronization Management Unit for IEEE 1588 and 10G/40G/100G Synchronous Ethernet, Jul. 10, 2018 (Year 2018) 75 pages.

Renesas, AN-1033, "Delay Variation Measurement and Compensation", Aplication Note, Feb. 8, 2019 (Year: 2019) 13 pages.

Renesas, AN-950, "82P338XX/9XX Usage of a Sync Input for Clock Alignment", Application Note, Nov. 10, 2016 (Year: 2016) 13 pages.

Silicon Labs, "UG103.05: IoT Endpoint Security Fundamentals," silabs.com, Rev. 1.2, downloaded Oct. 22, 2020, 12 pages.

Stanton, K., 802.1AS Tutorial, Intel Corporation, Nov. 13, 2008, 42 pages.

* cited by examiner

| CTL1 | |
|---|---|
| Bits | Description |
| 0 | Big Endian = 1 |
| 1 | Encrypt = 1 |
| 2 | Error Detection/Correction = 1 |
| 3 – 5 | 000 = 8 bit data follows<br>001 = 16 bit data follows<br>010 = 32 bit data follows<br>011 = 64 bit data follows<br>100 = 128 bit data follows<br>101 = 256 bit data follows<br>110 = 96 bit data follows<br>111 = invalid |
| 6 | Extend control word = 1 (future) |
| 7 | Big Endian = 1 |

Fig. 8

| CODE | DESRIPTION |
|---|---|
| 32Z | At least 32 zeros |
| B | Beacon (SYNC or ePPS) |
| CTL1 | Control Word Following Beacon |
| eTOD | 96 bits unencrypted (first data) |
| CTL2 | Control Word Following first data |
| C1/C2 | Variable Identifiers |
| D1 | Data for first CTL2/C1 |
| D2 | Data for second CTL2/C2 |

Fig. 7

| CTL2 ||
|---|---|
| Bits | Description |
| 0 | 0 = 8 bit, 1 = 16 bit variable name |
| 1 | Encrypt = 1 |
| 2 | Error Correction = 1 |
| 3-5 | 000 = 8 bit data follows<br>001 = 16 bit data follows<br>010 = 32 bit data follows<br>011 = 64 bit data follows<br>100 = 128 bit data follows<br>101 = 256 bit data follows<br>110 = 96 bit data follows<br>111 = invalid |
| 6 | Extend control word = 1 (future) |
| 7 | Last variable in chain = 1 |

DATA PROTOCOL OVER CLOCK LINE

BACKGROUND

Field of the Invention

This invention relates to network systems and more particularly to improving communications in network systems.

Description of the Related Art

Network communication boxes use timing protocols to ensure time of day (ToD) counters in the network are synchronized. SYNC signals are used to update time of day counters at the same time in the network. Any delay/offset and process, voltage, temperature (PVT) variation between the SYNC lines being supplied to the ToD counters in each line card in the network box results in an error that is classified as Continuous Time Error (CTE). Network communications are used to communicate various status and information regarding the system.

Figure 1:
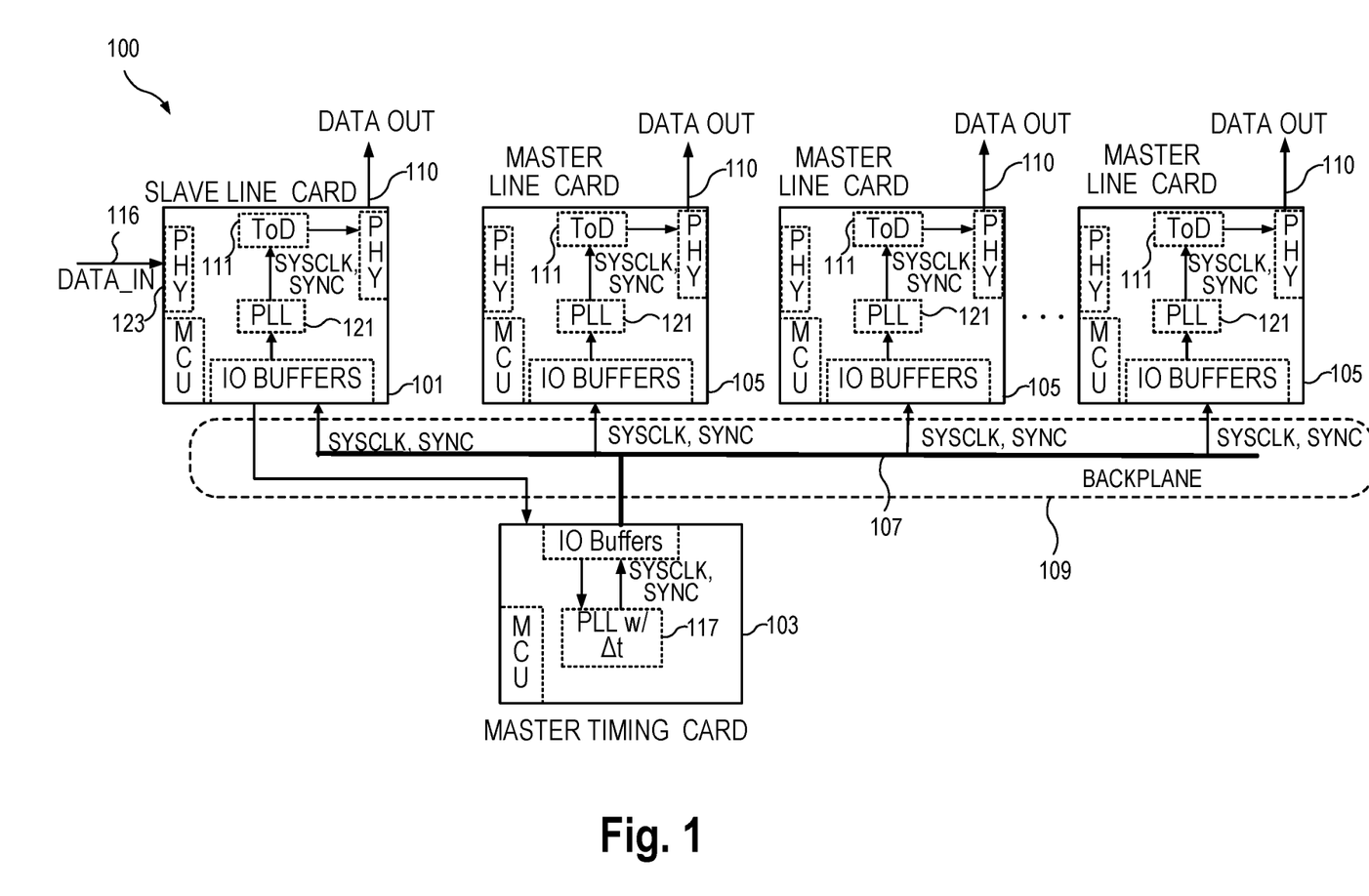
FIG. 1 illustrates a typical communication network system with a slave line card (LC), a master timing card (TC), and multiple master line cards coupled through a backplane.

FIG. 1 shows a typical architecture of communication network system 100 with a slave line card (LC) 101, a master timing card (TC) 103, and multiple master line cards 105. The data_out 110 from each line card is time stamped using time stamps from local Time of Day (ToD) counters 111. One challenge in the communication network system 100 is to keep the ToD counter on the slave line card aligned with the network timing associated with the incoming data stream on data_in 116. Another challenge is to maintain the ToD counters across different line cards in alignment over process, voltage, and temperature (PVT) variations so that all data_out 110 with their time stamps are aligned with each other and the incoming network time associated with data_in 116.

The master timing card 103 generates a SYNC signal and system clock signal (SYSCLK) using PLL 117 and dividers (not shown). The SYNC signal is also referred to as the F SYNC (frame sync) signal in certain contexts as the signal has different names (SYNC or FSYNC) at the system level or integrated circuit level inside the network box. The signal will be referred to as the SYNC signal herein for ease of reference. The master timing card 103 supplies the SYSCLK and SYNC signal (shown as signals 107) to all of the line cards 101 and 105 over backplane 109. The SYNC signal is a global signal inside the network system box 100 that signifies the right moment/edge for the Time of Day (ToD) counters 111 to rollover. The SYNC signal typically has a frequency range of 8 kHz to PP2S (pulse per 2 seconds). In many network systems the SYNC signal is a 1 pulse per second (1PPS) signal. SYNC is an integer divided down and edge aligned version of the system clock signal SYSCLK. The various ToD counters 111 contain the same value and turnover at the same time based on the SYNC signal. Each of the line cards 101 and 105 generate the local SYNC signal by dividing the SYSCLK generated by PLL 121 in a divider (not shown in FIG. 1) to the desired frequency.

Figure 2:
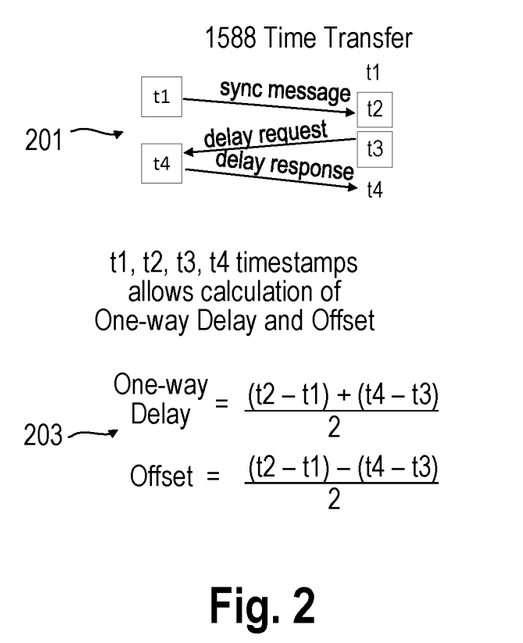
FIG. 2 illustrates an example of a time stamp exchange.

The exact position of the SYNC edge is derived using a precision time protocol (PTP) servo loop that uses the time information inside the incoming Synchronous Ethernet (SyncE) packet stream to the slave line card 101 on data in 116. FIG. 2 illustrates an example of a time stamp exchange 201 between an upstream PHY and the downstream PHY (e.g. PHY 123 in FIG. 1). Each of the time stamps t1-t4 represents the departure time (t1, t3) or the receive time (t2, t4). The timestamps exchange allows determination of one-way delay (OWD) and error offset between the upstream PHY and the downstream PHY shown at 203. That time stamp exchange allows the slave line card to determine the correct time provided by the upstream PHY even with delays between the upstream PHY and the downstream PHY. Note that the high level description of the PTP servo loop is provided as background information to provide context in which various embodiments described herein can be utilized.

The slave line card 101 and the master timing card 103 also have a closed loop PTP servo system in accordance with the IEEE 1588 protocol that corrects the position of the SYNC signal over process, voltage, and temperature (PVT) and aligns the SYNC signals distributed by the master timing card 103 to the timing of the incoming packet stream to the slave line card. The servo loop ensures that the slave line card and the master timing card are synchronized. The slave line card 101 and the master timing card 103 exchange information in the closed loop system to adjust the CLK and SYNC pair on the master timing card such that the slave line card ToD is aligned with the network ToD of the chosen incoming data stream on data_in 116. The PTP servo loop adjusts the timing of SYNC by adjusting PLL 117 so that the slave line card ToD is aligned in frequency and phase to the upstream ToD received by the slave line card on data_in 116. The distributed SYSCLK is supplied as a reference clock to the PLL 121 within each of the line cards and the line card PLLs generate a local SYSCLK and SYNC signal that is phase and frequency aligned with the distributed SYSCLK and SYNC signal. The master line cards 105 are duplicates (up to 64 copies) of the slave line card 101 but without the closed loop PTP servo loop. In other words, the distribution of the CLK/SYNC pair to the master line cards 105 is open loop (without the PTP closed loop adjustments). The timing card and various line cards communicate, at least in part, utilizing a serial communication bus (not shown in FIG. 1) to transmit various status and configuration information.

As the PLLs in the communication systems are becoming more complex and require more configuration, constant monitoring, adjustments, and system information to stay in sync with master timing signals and reduce error, there is a need to be able to offload some of these tasks from the shared serial communication port utilized by the various line cards and the master timing card.

SUMMARY OF EMBODIMENTS OF THE INVENTION

Accordingly, in one embodiment a method of transferring information over a first clock signal line in addition to a clock signal includes sending a first sequence from a first device to a plurality of receiving devices over the first clock signal line to identify a beacon is coming. A first control word is sent to the plurality of receiving devices after the beacon is sent. The first control word specifies a first length of first data following the first control word. A second control word is sent from the first device to the plurality of receiving devices before a next beacon is transmitted, the second control word specifying a second length of second data following the second control word. The second data is sent over the clock signal line and received at the plurality of receiving devices. The clock signal on the clock signal line is controlled to have different duty cycles according to the information sent over the first clock signal line.

In another embodiment a system includes a plurality of line cards and a timing card. A clock generation circuit on the timing card generates a clock signal. A pulse width modulation circuit modulates periods of the clock signal according to information to be transmitted to thereby generate a pulse width modulated clock signal. A clock signal line supplies the pulse width modulated clock signal to the plurality of line cards. The timing card is configured to send a first control word of a first type to the plurality of line cards after sending a beacon. The first control word includes a size field specifying a first length of first data following the first control word. The timing card is configured to send a second control word of a second type following the time of day information over the first signal clock line and before a next beacon, the second control word including a second size field specifying a second length of second data to follow the second control word. The second control word also specifies a length of a first variable identifier that follows the second control word and is associated with the second data.

In another embodiment a method includes sending a first sequence embedded in a clock signal on a first clock signal line from a first device to a plurality of receiving devices to identify a beacon is coming. The method further includes sending the beacon. A control word is embedded in the clock signal using pulse width modulation. The control word is sent to the plurality of receiving devices after sending the beacon. The control word includes a length field to specify a length of data to follow the control word. The method further includes sending time of day information embedded in the clock signal as the data over the first signal clock line to the receiving devices, the time of day information being encrypted if an encryption field in the control word has a first value and the time of day information not being encrypted if the encryption field has a second value.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 3:
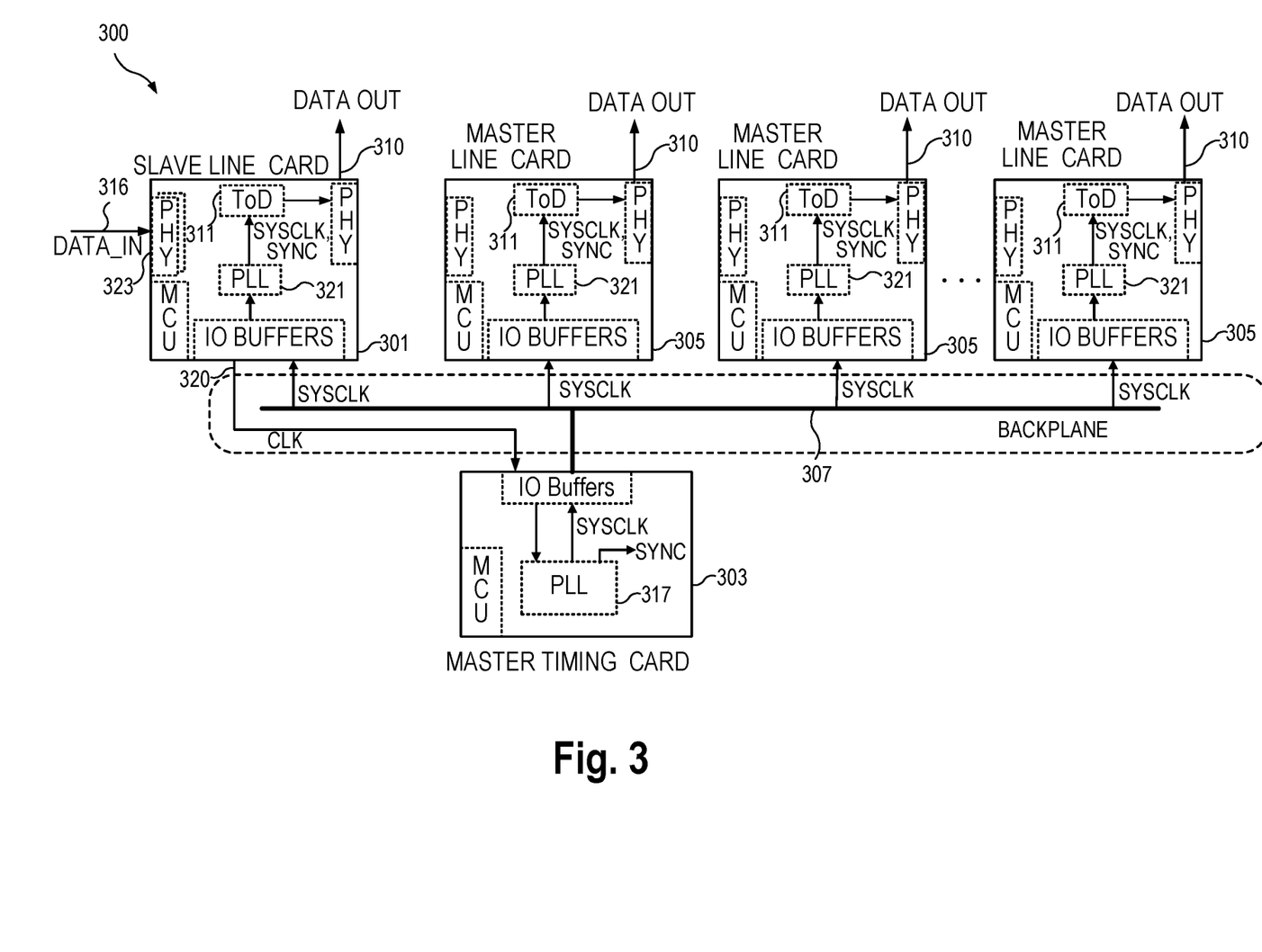
FIG. 3 illustrates an embodiment of a network system that distributes a pulse width modulated system clock with an embedded beacon.

To improve system communications, embodiments herein utilize the clock signal line to transport data to the line cards along with a beacon (i.e., the SYNC signal). Referring to FIG. 3, the network system 300 includes a slave line card 301, master timing card 303 and master line cards 305. The master timing card 303 distributes the system clock signal (SYSCLK) 307 to the various line cards 301 and 305. The master timing card embeds the beacon (e.g., an 8 kHz SYNC or a 1 PPS signal) in SYSCLK along with data as explained further herein instead of sending a separate SYNC signal as in the system of FIG. 1. As in the conventional system shown in FIG. 1, the embedded beacon along with the SYSCLK is used to align the various SYNC signals generated in the line cards with the timing of the SYNC signal determined by the slave line card. As further explained herein, in embodiments the master timing card also sends a time of day (ToD) value embedded in SYSCLK 307 representing the time of day of slave line card 301. The ToD sent is the ToD 311 on the slave line card 301. The slave line card ToD is aligned and in sync with the network time from the PHY 323.

The master timing card 303 in network system 300 uses PLL 317 and dividers (not shown) to generate SYSCLK and the global SYNC signal that is embedded in SYSCLK. The line cards utilize PLL 321 and the global SYNC signal to generate local SYNC signals used for the local time of day counters 311. The various ToD counters 311 contain the same value and turnover at the same time based on the local SYNC signal. However, in this case, the global SYNC signal is embedded in SYSCLK as described further herein rather than being distributed separately. The timing of the global SYNC signal is aligned with the timing of the input data stream 316 received on PHY 323. The line cards 301, 305 stamp their output data 310 with time stamps from the local ToD counters 311.

In addition, to generating the SYSCLK 307, in embodiments the master time card generates a Synchronous Ethernet (SyncE) clock signal not shown in FIG. 3. The SyncE clock signal is supplied to a separate SyncE PLL in the slave line cards so that the local SyncE clock signals are frequency and phase locked to the SyncE clock signal from the master timing card. Embodiments include a backup timing card that provides a backup SYSCLK and SyncE signals. The PTP loop implemented by the slave line card and the master timing card typically utilizes MCUs or other programmable functionality to implement PTP software. In addition, multiple PHYs are present on the slave line card and the particular PHY to which the timing of the slave line is synchronized can be selected. The PLLs in the slave line card and the master timing card are used to adjust the SYSCLK based on the PTP servo loop. The various time stamps required for the PTP servo loop are exchanged between the hosts on the slave line card and the master timing card. The hosts may be implemented as software running on MCUs. The master timing card 103 adjusts the phase of SYSCLK in accordance with the calculations of the PTP servo loop so that the SYNC at the ToD counter on the slave line card occurs at the desired time. FIG. 3 also shows a CLK signal 320 being transmitted from the slave line to the master timing card 303. The CLK 320 is generally a cleaner version of the clock signal recovered from data sent to the PHY 323 and the CLK 320 is supplied to the PLL 317 in the master timing card. The SYCLK 307 is a compensated/modified version of the CLK 320. The compensation depends on the system characteristics and delay budgets. While FIG. 3 shows that only SYSCLK is distributed over the backplane but not SYNC, for ease of illustration, the various components used to embed information in SYSCLK are omitted from FIG. 3 and shown instead in FIG. 4.

Figure 4:
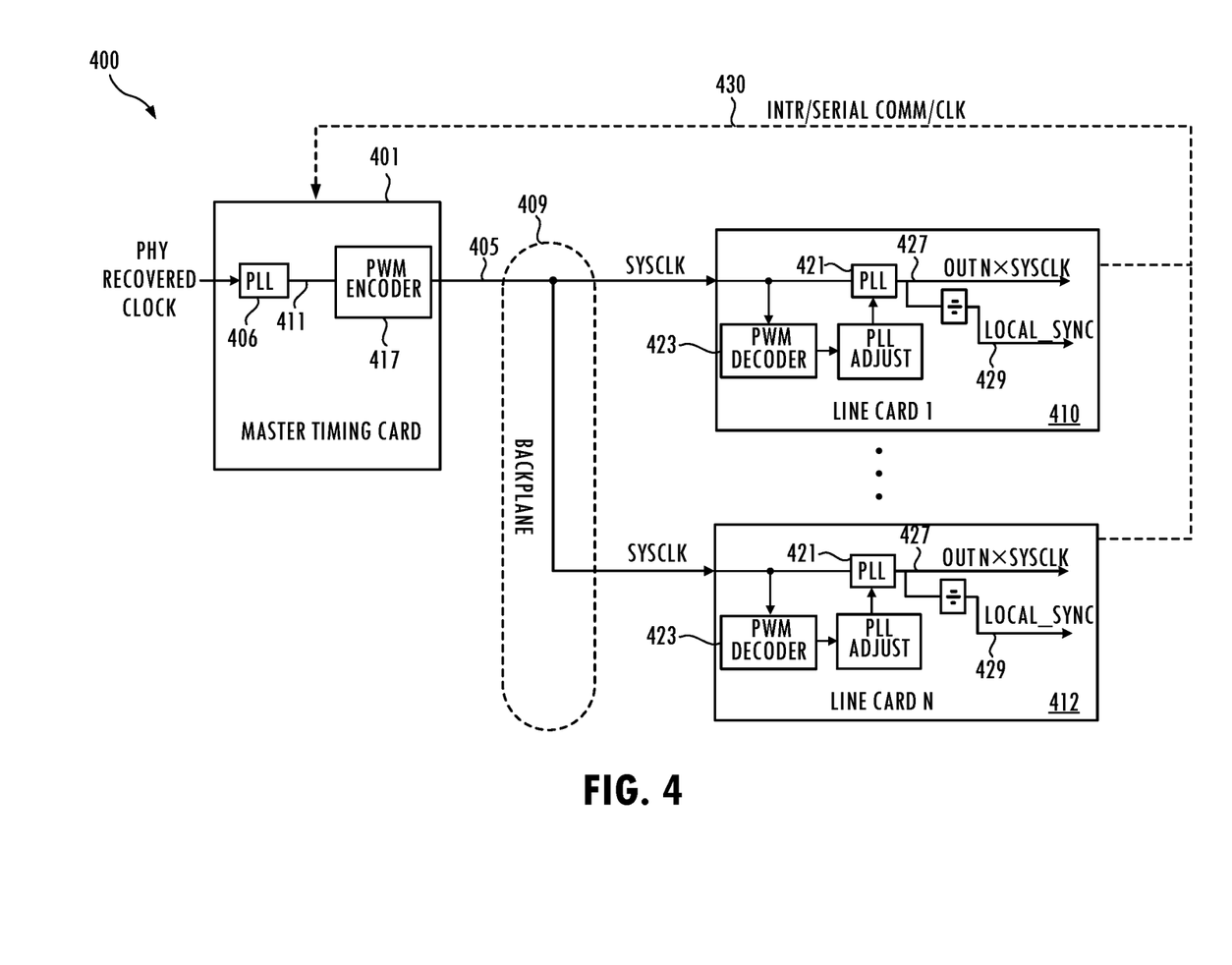
FIG. 4 illustrates a high level block diagram of an embodiment of a network communication that modulates the system clock signal to embed information therein.

FIG. 4 illustrates a high level block diagram of the network communication system 400 that includes the various components used to modulate SYSCLK to embed information in SYSCLK and demodulate SYSCLK to recover information embedded in SYSCLK. The master timing card 401 sends a pulse width modulated SYSCLK signal 405 to the line cards 410 and 412. The PLL 406 in the master timing card is adjusted so that the timing of the SYNC signal generated in the line cards is synchronized with the timing of the input stream on the selected PHY in the slave line card.

Figure 5:
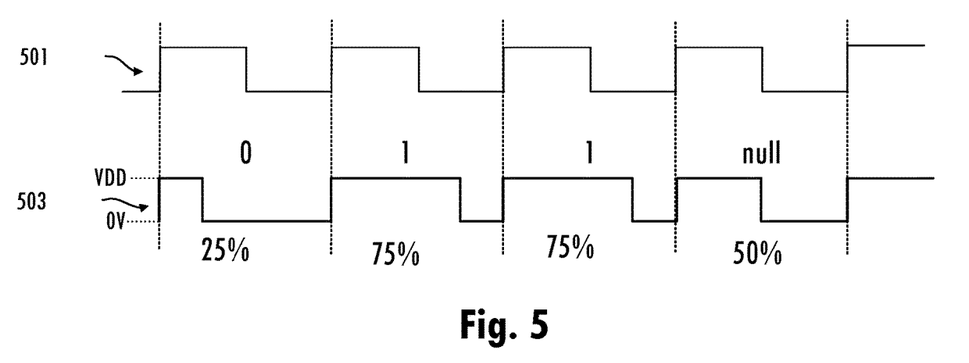
FIG. 5 illustrates an example of how pulse width modulation is used to embed information in the system clock signal.

FIG. 5 illustrates an example of how the master timing card 401 (FIG. 4) utilizes pulse width modulation to embed information in the SYSCLK signal. Without modulation the system clock signal SYSCLK shown at 501 has a 50% duty cycle. By modulating the duty cycle of SYSCKLK as shown at 503, the CLK signal can be used to transfer information. In the example shown in FIG. 5, the modulation uses a 25% duty cycle to represent a "0" or "1" and a 75% duty cycle to represent a "1" or "0". A 50% duty cycle represents a null.

Other embodiments utilize more complex modulation. For example, PWM is further extensible from 2 bits to n bits by using more duty cycles to represent data. For example, an embodiment utilizes 25%, 50%, 75% duty cycles to provide 3 states for 2 bit encoding/decoding. In such an embodiment, the 50% duty cycle is no longer a null. A more complex PWM encoding uses five different duty cycle states, 15%, 30%, 50%, 70%, 85% to provide 5 states for 3 bit encoding/decoding. As the PWM decoder/encoder capability increases, the data transfer capability increases but at the cost of increased complexity.

In addition to multiple duty cycles, multi-voltage input and output buffers can enhance data capability. For example, with reference to FIG. 5, the PWM encoding is from 0 to VDD thereby providing no improvement (1×) in data capability. However, use of three voltage levels, 0V, 50% VDD, 100% VDD provides a doubling (2×) of data transfer capability. More levels of voltage control provide further extensibility. As with the use of an increased number of duty cycles, an increased number of voltages increases complexity. Data capability can also be enhanced by using one or more additional clock lines but that requires additional backplane signals and additional encoder/decoders. The beacons on the additional clock line(s) can be separate from the other clock line. For example, the master line card can pulse width modulate the SyncE clock signal in addition to the SYSCLK.

Referring back to FIG. 4, the PLL 406 in master timing card 401 generates the 50% (or other duty cycle) system clock signal 411 and supplies the clock signal 411 to the PWM encoder 417, which in turn generates the modulated SYSCLK signal 405. The PWM encoder adjusts the duty cycle of the clock signal 411 according to the information being transferred. The PWM encoder 417 represents both the hardware PWM encoding and related encoding and control functionality needed to modulate SYSCLK to embed information as described herein, which functionality is described further herein. The pulse width modulated system clock signal 405 is supplied to the backplane 409 and distributed to N line cards including line cards 410 and 412. Each of the line cards 410 and 412 receives the system clock signal 405 and supplies the system clock signal to the PLL 421. The SYSCLK signal may be divided down in the line cards 410 and 412 in dividers (not shown) before being supplied to the PLLs 421 in the line cards. In addition, the SYSCLK signal is supplied to the PWM decoder 423 for the PWM decoder to extract the information transmitted in SYSCLK. The information transferred over the SYSCLK signal line can be used to adjust the PLL 421 to maintain the locally generated SYNC signal 429 to be synchronous with the slave line card's SYNC signal. The PLL 421 generates a system clock output clock 427, which is divided down to produce a local SYNC output signal 429, which is supplied, e.g., to the ToD counter in the line card (not shown in FIG. 4). A circular first in first out (FIFO) buffer may be used to supply data to be encoded in SYSCLK. The PWM decoder 423 represents both the hardware PWM decoding and related decoding and control functionality needed to demodulate SYSCLK to extract embedded information, which functionality is described further herein. PWM encoders and decoders and associated control functionality are implemented in hardware or hardware assisted by programmable logic such as an MCU.

Figure 6A:
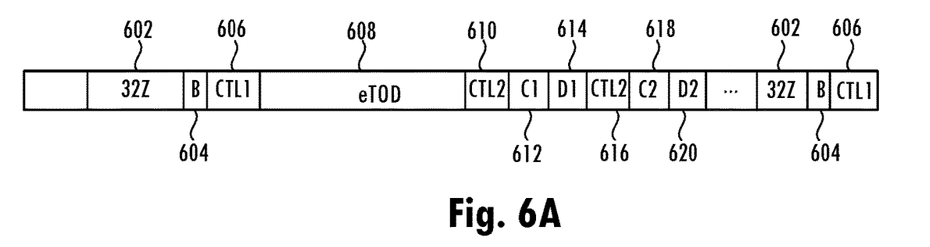
FIG. 6A illustrates an example of transfer of information using a pulse width modulated system clock signal.
Figure 6B:
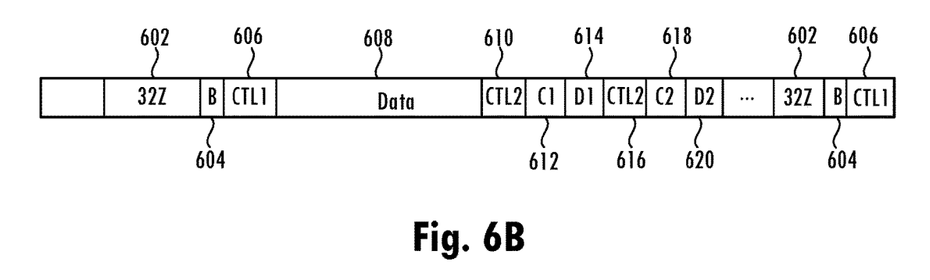
FIG. 6B illustrates another example of transfer of information using a pulse width modulated system clock signal.
Figure 7:
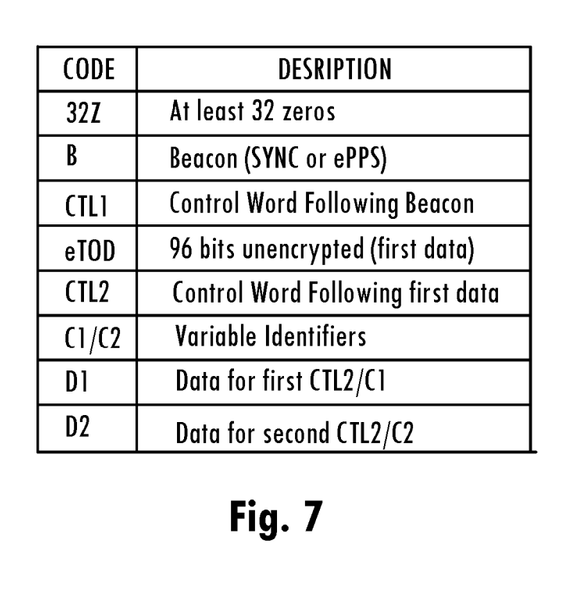
FIG. 7 describes the various types of information transferred.

FIGS. 6A, 6B, and 7 illustrate an exemplary protocol for transfers over the PWM clock signal line. FIGS. 6A and 6B illustrate the information transferred and the sequence of those transfers and FIG. 7 describes the transferred information. The protocol starts with a unique sequence on the clock signal line to identify a beacon is coming. Beacon is a general term referring to the SYNC signal and may range from, e.g., an 8 kHz signal to a PP2S. Typical frequencies utilized are 8 kHz and 1 PPS. Those frequencies are by way of example and the frequency of the beacon depends on the needs of the particular system. The sequence 602 shown in FIG. 6A is at least 32 zeros. For example, in an embodiment that constitutes at least 32 25% duty cycle SYSCLK signals. That causes the PWM decoder to start looking for a different value on the clock signal, which different value represents the beacon. For example, the decoder may look for the beacon encoded as a null (50% duty cycle) or a "1" (75% duty cycle). Once the beacon is received, control logic associated with the PWM decoder, expects a control word (CTL1) 606. Following the first control word 606, data, e.g., an embedded time of day value (eToD), is sent to provide the time of day corresponding to the beacon 604. In embodiments the eToD value that is sent right after the beacon corresponds to the immediately preceding beacon or the eTod value can be the value for an earlier beacon or the next beacon. The particular eToD that is sent following each beacon can be a predetermined setup determination or a configurable aspect of the system. After the time of day (or other data) 608 is sent, a second control word (CTL2) 610 is sent. There are embodiments in which certain components in the system have more capabilities than other components. Thus, the second control word provides control where additional capabilities are available. For those components without such capabilities, e.g., legacy components or components from particular vendors, the second control word can be ignored and those components can ignore information being transferred on the clock signal line and await the 32 bit sequence to alert the receiver to look for the next beacon. After the second control word CTL2 610 is transferred, variable control word (C1) 612 is followed by data 614. The variable control word C1 612 is a variable identifier and can be thought of as a variable pneumonic. If more data is to be transmitted, a second CTL2 control word 616 is sent followed by a second variable control word C2 (variable identifier) 618. The variable identifier 618 is followed by additional data D2 620. Information can continue to be transferred in SYSCLK until it is time for the next sequence to identify a beacon is coming at 602 and the process repeats. In an embodiment, the systems has an 8 kHz SYNC signal and a 10 MHz SYSCLK, which allows for 1250 bits or clock periods between each SYNC signal.

While FIG. 6A shows transfer of an eTOD 608, in other embodiments, a short data is sent in place of eToD as shown in FIG. 6B. In FIG. 6B, the CTL1 word 606 is followed by data and the CTL2 packet. If there is no ToD information needed, the data length in the CTL1 word 606 is set to 8 bits (the minimum value or some other length) and the data 608 is filled with zeros (or some other value) to indicate the information can be ignored or can be loaded with other information such as status information. The second control word CTL2 610 follows the CTL1 data 608 with the C1/D1 variable mnemonic/data pair 612/614 and any subsequent CTL2s have a Cx/Dx variable mnemonic/data pair. If there are third party receivers in the system that do not understand the protocol, then in embodiments the data length field in CTL1 word 606 defaults to send 96 bits, filled with 96 zeros, and then one or more CTL2 words 610 with Cx/Dx pairs are sent. By that time, the third party receivers who do not understand the protocol have stopped listening for data.

Referring back to FIG. 3, the master timing card 303 and the slave line card 301 are in a closed loop (PTP/1588) for frequency and phase correction. While the master line cards 305 are supposed to replicate the slave line card in terms of frequency and phase, the open loop setup of the master line cards with the master timing card and PVT variations make it hard for that replication to be maintained with accuracy. The transfer of eToD and ePPS on SYSCLK help keep the ToD counters aligned even with mismatch caused by PVT variations.

Figure 8:
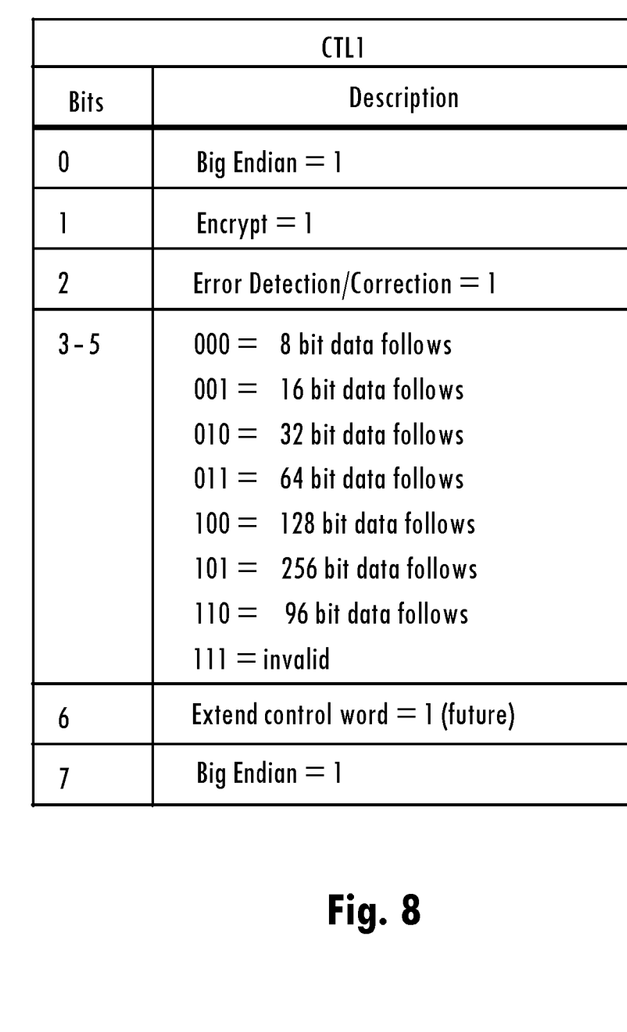
FIG. 8 illustrates an embodiment of the fields used in control words transferred using a pulse width modulated system clock signal.

FIG. 8 describes an embodiment of the fields used in the control word 606(CTL1). In the embodiment described in FIG. 8, the first and last bits, bit 0 and bit 7 indicate the order (big endian or little endian) of the control word. Bit 1 indicates whether the data following the control word is encrypted. That allows eToD to be encrypted to provide for integrity and hijack protection over the backplane. The encryption used may be, e.g., symmetric AES-128 or AES-256. Bit 2 indicates whether error detection/correction is used. The error detection/correction bit can be used to specify, e.g., that 1 bit correction is provided or that only error detection is provided, e.g., through one or more parity bits or a cyclic redundancy check (CRC) packet included in the data transfer. Bits 3-5 specify the length of the data that follows the control word. For example, the data that follows may be the time of day. In an embodiment that length is 96 bits but other embodiments can have other lengths. If encryption is used, the length can be longer. Bit 6 indicates whether the control word is extended, e.g., by another 8 bits, to allow for future growth. Note the bits shown in FIG. 8 are exemplary and the control word can include additional fields or additional bits for certain fields or fewer fields and fewer bits.

Figure 9:
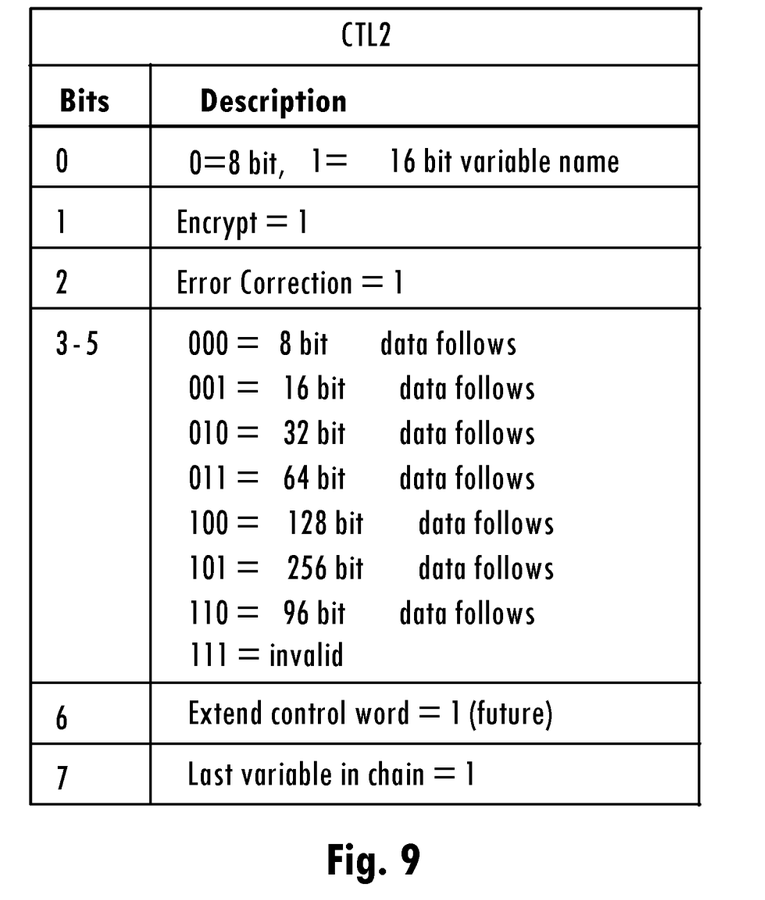
FIG. 9 illustrates an embodiment of the fields used in other control words transferred using a pulse width modulated system clock signal.

FIG. 9 illustrates exemplary fields for the control word 610 (CTL2). As big or little endian has already been specified, that is no longer necessary. Bit 0 specifies whether the variable control word that follows, i.e., C1 or C2, is an 8 bit or 16 bit variable identifier. The variable control word identifies, e.g., a particular type of information being transferred, e.g., temperature, bandwidth, and/or can be used as an address to specify a unique line card and/or a unique location within the line card. For example, in an embodiment the variable control word having the hexadecimal value 0x2 indicates temperature measurement, and 0xA indicates loop bandwidth. Allowing the size of the variable identifier to be 8 or 16 bits allows for greater than 256 control variables if needed. Required variables are defined for product and family of parts or for a particular system application. The control variable bits in C1 and C2 can also be used to indicate a broadcast or multicast to all or selected ones of the line cards. Referring still to FIG. 9, bit 1 indicates whether the data that follows the control word CTL2 is encrypted. Bit 2 specifies whether error detection/correction is used for the data. Bits 3-5 specify the length of the data that follows the control word. Bit 6 indicates whether the control word is extended, e.g., by another 8 bits, to allow for future growth. Bit 7 specifies whether the control word is the last CTL2 control word in the chain before the next beacon. That allows the PWM decoding logic to look for the sequence identifying the next beacon once the data associated with the last CTL2 control word has been received.

The information sent over the PWM CLKSYS signal helps reduce continuous time error (CTE), especially for ClassD systems. Thus, the slave line card and master timing card information can be sent to the master line cards. That information includes F SYNC timestamps, which are timestamps from a voltage controlled oscillator clock domain timestamper and are related to ToD's but are not the same. The FYSNC timestamps can be used for phase correlation. The information can further include the temperature of the slave line card, which allows the master line cards to take account of the temperature in generation of their local clocks. The information can include lock and bandwidth information. For example, lock may be lost on the PLL generating SYSCLK requiring a switch to the backup timing card. The frequency of the clock signal can change potentially requiring a change in bandwidth of the local PLLs in the line cards. The PHY that is chosen for the slave line card to sync to may change. Other upcoming changes in the system can be communicated. The slave line card also has a backup. PTP algorithm information may be transferred to the backup slave line card using the PWM SYSCLK signal.

Figure 10:
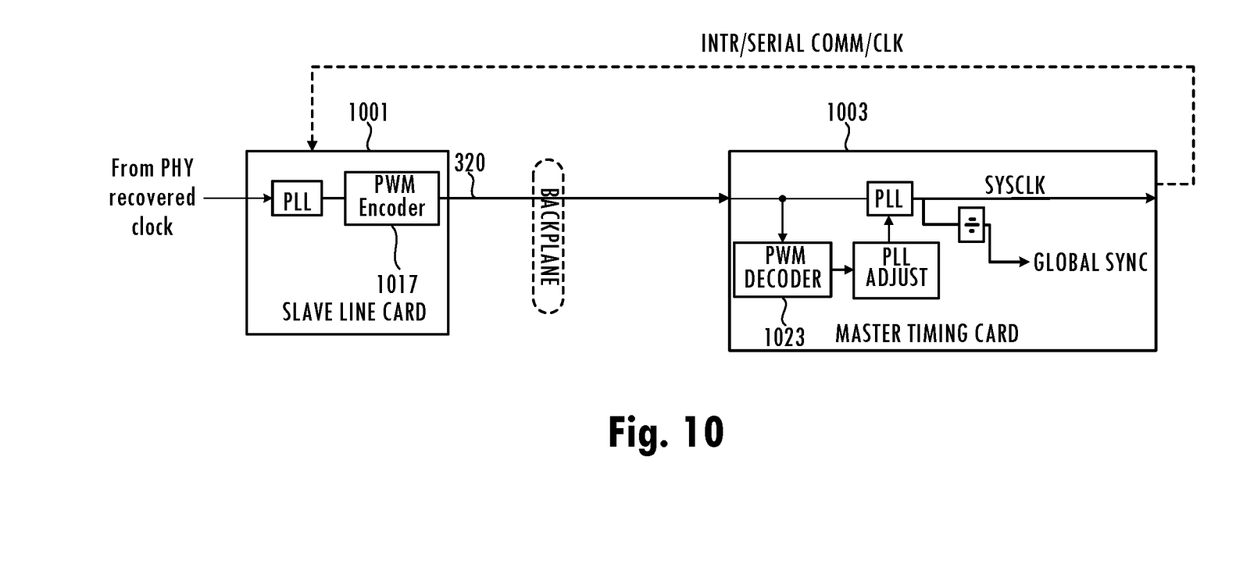
FIG. 10 illustrates an embodiment in which a slave line card embeds information in a clock signal sent from the slave line card to the master timing card.

Since the master timing card controls the modulation of SYSCLK based on the PTP loop control mechanism, the slave line card sends information on slave line card status, temperature, etc. to the master timing card, which in turn sends the slave line card information to the master line cards. As shown in FIG. 3, the slave line card sends the clock signal 320 to the master timing card. The slave line card embeds information for the master line card by modulating the clock signal 320. That information includes information including the time of day and can include an FSYNC signal, e.g., generated on the slave line card. Referring to FIG. 10, that is accomplished by the slave line card 1001 modulating the clock signal in the PWM encoder 1017 and the master timing card 1003 demodulating the clock signal 320 in the PWM decoder 1023. The protocol remains the same, using the same control words, the placement of the beacon, the placement of time of day if transmitted, and the second control words (CTL2) with variable pneumonic/data pairs as described above. CLK 320 carries an embedded SYNC signal, which indicates the start of the protocol following the pre beacon sequence 602 (see FIGS. 6A and 6B). The received SYNC is optionally used inside the master timing card. The CLKSYS signal 307 is routed back to the slave line card, where it goes to the PLL, then to the ToD timestamper in the PHY and is used by the PTP algorithm to correct any phase delays back at the master timing card digitally controlled oscillator (also known as phase jam).

Generally, CLK 320 carries PTP related information useful to the master (and slave) timing cards and the CLK 307 carries information useful to all the line cards (slave and master). Between every beacon (or SYNC), the CLK 307 and CLK 320 can carry varying amount of information depending on system needs and required updates within the system. The master timing card in turn takes the slave line card information, modifies the information for system needs like delay compensation, status and bandwidth changes, secondary timing card information, etc. and then sends the information and other status to the master line cards. Essentially, two independent versions of the protocol run simultaneously on CLK 320 and SYSCLK 307.

In embodiments the master line cards use a closed loop response mechanism to acknowledge receipt or request retransmission of information contained in the modulated SYSCLK signal. Referring again to FIG. 4, the master line cards may use an interrupt (INTR) signal and/or a serial port 430 to let the sender (slave line card or master timing card) know if the information was received and decoded properly and/or was corrupted and a retransmit is needed.

Figure 11:
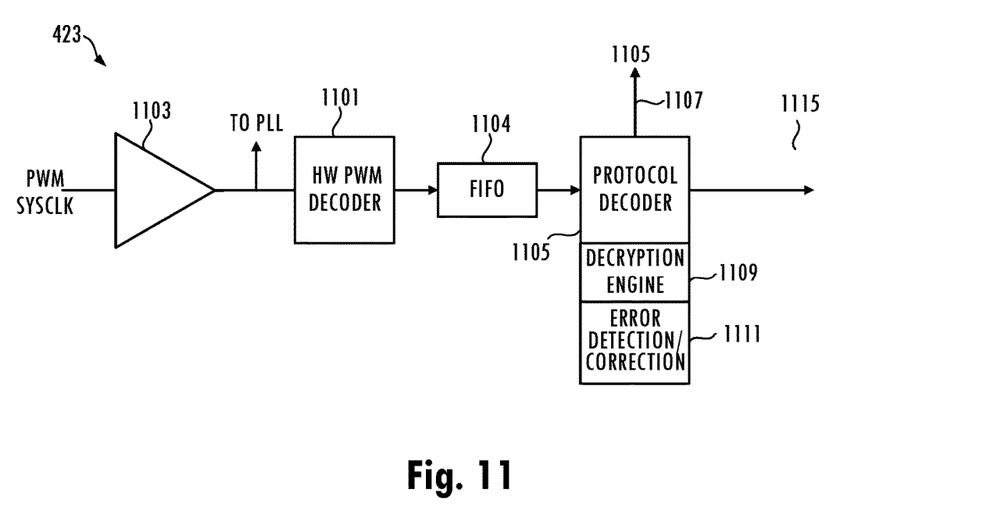
FIG. 11 illustrates a high level block diagram of functionality associated with the receiver of the pulse width modulated system clock signal.

Referring still to FIG. 4, note that although FIG. 4 shows the PWM decoder 423 as a single block, the single block represents multiple functions to demodulate, decode, and utilize the PWM encoded information. With reference to FIG. 11, the single PWM demodulator block 423 is shown in more detail. A hardware (HW) pulse width demodulator (or decoder) 1101 is coupled to a SYSCLK input buffer 1103 and the PWM decoder supplies 1s and 0s to downstream logic based on the period of SYSCLK. The is and 0s may be supplied, e.g., to a hardware serial circular first in first out (FIFO) buffer 1104. The depth of the FIFO 1104 varies according to how quickly information from the FIFO can be processed so the read and write pointers do not cross and destroy data. The depth is application specific. For example, in one embodiment the FIFO is 128 bits. In addition to the demodulate function to convert the period of SYSCLK to bit values, a protocol decoder searches for the sequence prior to the beacon, e.g., the at least 32 zeros, searches for the beacon at the end of the sequence and supplies the SYNC signal 1107 for consumption by the line card. The protocol decoder 1105 then searches for the control word used to set up further transactions. An additional capability provided in some embodiments is to encrypt the data being transferred by the master timing card (or the slave line card). In such embodiments, the data to be transferred is encrypted by encryption engine before the modulation occurs. If data is encrypted, a decryption engine 1109 decrypts the transmission. If the transmission is not encrypted the decryption engine 1109 is bypassed. An additional capability provided in some embodiments is to provide error detection/correction bits for the data being transferred by the master timing card. If error detection/correction is utilized on transmission, an error detection/correction engine 1111 detects and corrects errors and reports uncorrectable errors and/or requests retransmission. If error detection/correction is not used the error detection/correction logic 1111 is bypassed. In addition, the control words themselves are decoded including the length of variable name and length of data so information transmitted is supplied to appropriate memory locations in the line card. Thus, for example, transmitted slave temperature information is supplied to a temperature register in the line card. The time of day is supplied to the memory location that utilizes the time of day to help adjust the local SYNC signal as needed. Note that while shown as separate blocks, the decryption engine 1109 and the error detection/correction block 1111 provide functionality required to decode certain aspects of the protocol, e.g., the variable name identifying the destination in the line card and the data to be stored in the appropriate location in the line card need to be decrypted and/or error corrected before being utilized. The protocol decoding function further determines when a transmission is a broadcast, multicast, or a transmission specifically addresses the particular line card or the transmission is intended (addressed) for another line card so the data can be ignored except to track the length of the data so the protocol decoder can look for the end of the data and another variable control word. The various functionality can be assisted by firmware running on a programmed microcontroller to assist and control various hardware functions associated with the various decoding functions in the receiver.

Figure 12:
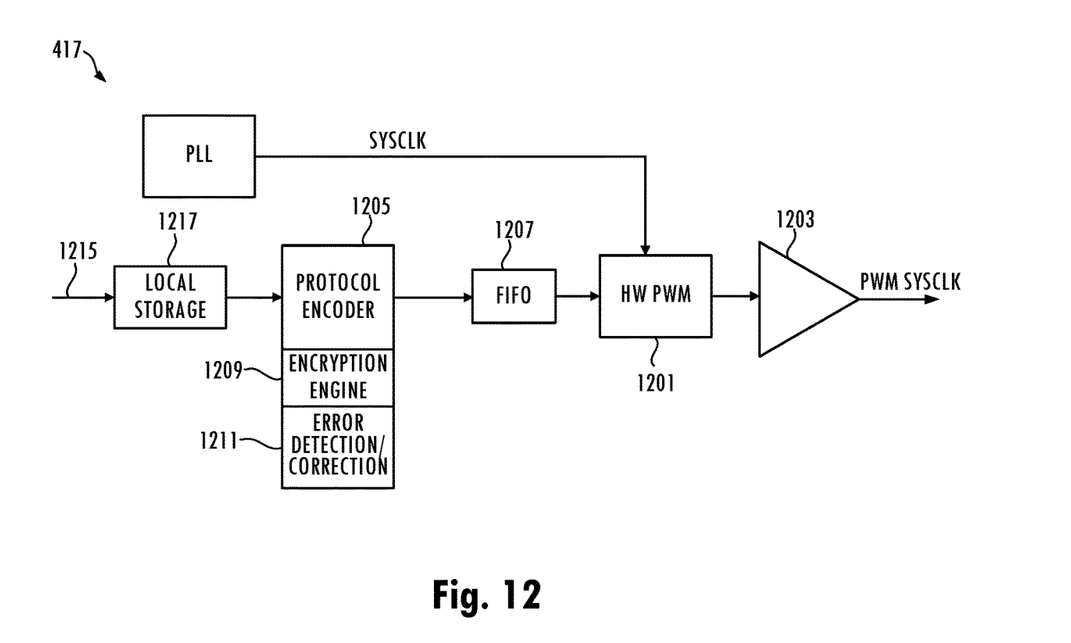
FIG. 12 illustrates a high level block diagram of functionality associated with the sender of the pulse width modulated system clock signal.

The encoding function on the transmitter side performs the opposite functions of the receiving side. Referring to FIG. 12, a physical layer HW PWM encoder 1201 supplies an output buffer 1203 with the PWM modulated SYSCLK signal. The duty cycle on SYSCLK is adjusted using one or more dividers, counters, and/or other appropriate logic in the PWM encoder to achieve the desired pulse width on SYSCLK. Such encoding schemes are well known in the art. A protocol encoder 1205 supplies serial FIFO 1207 with the appropriate bit values and the FIFO 1207 supplies the a bit value to the hardware PWM encoder 1201 for each cycle of SYSCLK. Note that the protocol encoder needs information in time to ensure that the encoding can take place without interruption as SYSCLK cannot stop. Thus, transfers that require encryption by encryption engine 1209, and/or error coding by error detection/correction encoding 1211 have to have the data ready in sufficient time to be in the FIFO in time for transmission. Where encryption and/or error detection/correction is not utilized, those functions are bypassed. The protocol encoder selects the right control words at the right time. In addition, the protocol encoder has to monitor the occurrence of SYNC. Since SYNC is a divided down version of SYSCLK, the protocol encoder, or logic associated therewith, monitors the count used to generate SYNC. For example, with an 8 kHz SYNC and 10 MHz SYSCLK, SYNC occurs every 1250 bits of SYSCLK. Thus, as the divider count approaches 1250, the protocol encoder ensures that at least 32 zeros (or other desired sequence) occurs before the beacon (SYNC) is transmitted. The protocol encoder transmits data such as slave time of day, slave temperature, configuration information, etc. The protocol encoder sends out the appropriate control words and data in accordance with FIGS. 6-9. Since information supplied to the protocol encoder over signal line 1215 can be asynchronous, a local copy of the data to be transmitted is stored in storage 1217 until the data is needed to allow for uninterrupted operation. When data is not ready to be transmitted, the protocol encoder ensures that appropriate control words are sent indicating, e.g., that the transmission, except for the data length, can be ignored. Typical embodiments will have significant firmware assist to the protocol encoder from a microcontroller unit or other processor operating on the master timing card or the slave line card to assist in performing necessary encoding operations described herein. Embodiments may use hardware to provide error detection/correction encoding and encryption for speed.

Thus, various embodiments for embedding information in the system clock signal have been described. The description of the invention set forth herein is illustrative, and is not intended to limit the scope of the invention as set forth in the following claims. Variations and modifications of the embodiments disclosed herein, may be made based on the description set forth herein, without departing from the scope of the invention as set forth in the following claims.

What is claimed is:

1. A method for transferring information over a first clock signal line in addition to a clock signal, the method comprising:
   sending a first sequence from a first device to a plurality of receiving devices over the first clock signal line to identify a beacon is coming;
   sending a first control word to the plurality of receiving devices after sending the beacon, the first control word specifying a first length of first data following the first control word;
   sending a second control word from the first device to the plurality of receiving devices before a next beacon is transmitted, the second control word specifying a second length of second data following the second control word and specifying a length of a variable identifier associated with the second data;
   sending the second data over the first clock signal line and receiving the second data at the plurality of receiving devices; and
   controlling the clock signal on the first clock signal line to have different duty cycles according to the information sent over the first clock signal line.

2. The method as recited in claim 1 further comprising sending time of day information over the first clock signal line as the first data.

3. The method as recited in claim 2 further comprising encrypting the time of day information transferred over the first clock signal line.

4. The method as recited in claim 2 further comprising specifying in the first control word whether or not the time of day information is encrypted.

5. The method as recited in claim 1 wherein the first control word is of a first type and the second control word is of a second type.

6. The method as recited in claim 5 further comprising sending a third control word of the second type over the first clock signal line after the second control word is sent, the third control word specifying a third length of third data following the third control word and specifying a length of a second variable identifier associated with the second data.

7. The method as recited in claim 5 further comprising specifying in the second control word whether encryption is used for the second data.

8. The method as recited in claim 5 further comprising specifying in the second control word whether or not error correction is utilized in the second data.

9. The method as recited in claim 1 further comprising sending second information from a second device to the first device over a second clock signal line using pulse width modulation of a second clock signal sent over the second clock signal line.

10. The method as recited in claim 1 further comprising one or more of the plurality of receiving devices sending a message to the first device regarding status of receipt of the second data.

11. An apparatus comprising:
   a plurality of line cards;
   a timing card, the timing card being configured to send a first control word of a first type to the plurality of line cards after sending a beacon, the first control word including a first size field specifying a first length of first data following the first control word;
   a clock generation circuit on the timing card to generate a clock signal;
   a pulse width modulation circuit to modulate periods of the clock signal according to information to be transmitted to thereby generate a pulse width modulated clock signal;
   a clock signal line to supply the pulse width modulated clock signal from the timing card to the plurality of line cards; and
   the timing card being further configured to send a second control word of a second type following the first data over the clock signal line and before a next beacon, the second control word including a second size field specifying a second length of second data to follow the second control word, the second control word specifying a length of a first variable identifier that follows the second control word and is associated with the second data.

12. The apparatus as recited in claim 11 further comprising:
   a second clock signal line coupling one of the line cards and the timing card, the one of the line cards being configured to send a second beacon and a third control word of the first type following the second beacon and having a third size field specifying a size of third data to be sent over the second clock signal line to the timing card; and
   a second pulse width modulation circuit on the one of the line cards to pulse width modulate a second clock signal on the second clock signal line in accordance with the third control word.

13. The apparatus as recited in claim 12 wherein the one of the line cards is configured to send a fourth control word of the second type following the third data over the clock signal line and before a third beacon, the fourth control word including a fourth size field specifying a fourth length of fourth data to follow the fourth control word, the fourth control word specifying a length of a second variable identifier that follows the fourth control word and is associated with the fourth data.

14. The apparatus as recited in claim 11 wherein the timing card is configured to send time of day information over the clock signal line as the first data following the first control word.

15. The apparatus as recited in claim 11 wherein the second control word includes an error correction field having a first value to specify error correction is to be used on the second data following the second control word and a second value to specify that error correction is not to be used on the second data following the second control word.

16. The apparatus as recited in claim 11 wherein the second control word includes an encryption field having a first value to specify encryption is to be used on the second data following the second control word and a second value to specify that encryption is not to be used on the second data following the second control word.

17. The apparatus as recited in claim 11 further comprising a serial bus coupling the line cards to the timing card.

18. The apparatus as recited in claim 11 wherein control words of the second type include a last control word field having a first value to indicate a respective control word of the second type is a last control word of the second type before the next beacon and a second value to indicate the respective control word of the second type is not the last control word before the next beacon.

19. The apparatus as recited in claim 11 wherein each of the line cards further comprises:
   a phase-locked loop coupled to the clock signal line; and
   a pulse width demodulator circuit to demodulate the pulse width modulated clock signal on the clock signal line to recover information transmitted in the pulse width modulated clock signal.

20. A method comprising:
   sending a first sequence embedded in a clock signal on a first clock signal line from a first device to a plurality of receiving devices to identify a beacon is coming;
   sending the beacon;
   embedding a control word in the clock signal using pulse width modulation;
   sending the control word to the plurality of receiving devices after sending the beacon, the control word including a length field to specify a length of data to follow the control word; and
   sending time of day information embedded in the clock signal over the first signal clock line to the receiving devices as the data, the time of day information being encrypted if an encryption field in the control word has a first value and the time of day information not being encrypted if the encryption field has a second value.

21. The method as recited in claim 6 further comprising sending to the plurality of receiving devices a last control word field in control words of the second type, the last control word field having a first value to indicate that a respective control word of the second type is a last control word of the second type before the next beacon and a second value to indicate the second control word is not the last control word of the second type before the next beacon.

22. The apparatus as recited in claim 14 wherein the first control word includes an encryption field having a first value to specify the time of day information will be encrypted and a second value to specify the time of day information will not be encrypted.

23. The apparatus as recited in claim 17 wherein one or more of the line cards is configured to send an acknowledge over the serial bus to indicate status of information transmitted over the clock signal line.

\* \* \* \* \*